United States Patent
Tsukamoto et al.

(10) Patent No.: US 8,465,702 B2
(45) Date of Patent: Jun. 18, 2013

(54) EXHAUST PURIFICATION SYSTEM OF INTERNAL COMBUSTION ENGINE

(75) Inventors: Yoshihisa Tsukamoto, Susono (JP); Hiromasa Nishioka, Susono (JP); Katsuhiko Oshikawa, Tokyo (JP); Hiroshi Otsuki, Susono (JP); Junichi Matsuo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/581,766

(22) PCT Filed: May 12, 2010

(86) PCT No.: PCT/JP2010/058402
§ 371 (c)(1),
(2), (4) Date: Aug. 29, 2012

(87) PCT Pub. No.: WO2011/142041
PCT Pub. Date: Nov. 17, 2011

(65) Prior Publication Data
US 2013/0052087 A1    Feb. 28, 2013

(51) Int. Cl.
*B01D 50/00* (2006.01)
*F01N 3/10* (2006.01)

(52) U.S. Cl.
USPC ................. 422/171; 60/300; 60/301

(58) Field of Classification Search
USPC ............. 422/168, 171; 60/300, 301, 303
See application file for complete search history.

(56) References Cited

U.S. PATENT DOCUMENTS
2010/0139259 A1 * 6/2010 Hirota et al. ............ 60/301
2012/0294770 A1 * 11/2012 Imai ....................... 422/168

FOREIGN PATENT DOCUMENTS
| JP | A-9-248448 | 9/1997 |
| JP | 2801423 | 9/1998 |
| JP | A-2007-218177 | 8/2007 |
| JP | A-2009-47095 | 3/2009 |
| JP | A-2009-82846 | 4/2009 |
| JP | A-2009-112948 | 5/2009 |
| JP | A-2009-275631 | 11/2009 |

OTHER PUBLICATIONS
Aug. 10, 2010 International Search Report issued in International Application No. PCT/JP2010/058402 (with translation).

* cited by examiner

*Primary Examiner* — Tom Duong
(74) *Attorney, Agent, or Firm* — Oliff & Berridge, PLC

(57) ABSTRACT

In an exhaust purification system of an internal combustion engine of the present invention, a silver-alumina-based catalyst device and $NO_X$ reducing catalyst device are arranged in the engine exhaust system. When a temperature of the silver-alumina-based catalyst device becomes a first set temperature T1 on the high temperature side, $NO_X$ released from the silver-alumina-based catalyst device is reduced by reducing material to be purified in the $NO_X$ reducing catalyst device. When the temperature of the silver-alumina-based catalyst device becomes a second set temperature on the low temperature side, $NO_X$ released from the silver-alumina-based catalyst device is reduced by reducing material to be purified in the $NO_X$ reducing catalyst device.

9 Claims, 2 Drawing Sheets

EXHAUST GAS FLOW

EXHAUST PURIFICATION SYSTEM OF INTERNAL COMBUSTION ENGINE

TECHNICAL FIELD

The present invention relates to an exhaust purification system of an internal combustion engine.

BACKGROUND ART

A known catalyst device carries silver oxide by use of alumina as a carrier coat material (for example, refer to Japanese Patent No. 2801423). Such a silver-alumina-based catalyst device adsorbs $NO_X$ in the exhaust gas and releases the adsorbed $NO_X$ when a temperature thereof becomes a set temperature (for example, refer to Japanese Unexamined Patent Publication No. 2009-275631).

DISCLOSURE OF THE INVENTION $NO_X$ released from the above mentioned silver-alumina-based catalyst device when the temperature thereof reaches the set temperature is usually reduced by the supplied reducing material to be purified in a catalyst device arranged downstream it.

However, only by the reduction and purification of $NO_X$ when the temperature of the silver-alumina-based catalyst device reaches the set temperature, an amount of $NO_X$ emitted into the atmosphere cannot be sufficiently decreased.

Accordingly, an object of the present invention is to provide an exhaust purification system of an internal combustion engine wherein a silver-alumina-based catalyst device and $NO_X$ reducing catalyst device are arranged in the exhaust system, which can sufficiently decrease an amount of $NO_X$ emitted into the atmosphere.

An exhaust purification system of an internal combustion engine as set forth in claim 1 of the present invention wherein a silver-alumina-based catalyst device and $NO_X$ reducing catalyst device are arranged in the engine exhaust system is provided as the exhaust purification system of an internal combustion engine characterized in that when a temperature of the silver-alumina-based catalyst device becomes a first set temperature on the high temperature side, $NO_X$ released from the silver-alumina-based catalyst device is reduced by reducing material to be purified in the $NO_X$ reducing catalyst device and when the temperature of the silver-alumina-based catalyst device becomes a second set temperature on the low temperature side, $NO_X$ released from the silver-alumina-based catalyst device is also reduced by reducing material to be purified in the $NO_X$ reducing catalyst device.

An exhaust purification system of an internal combustion engine as set forth in claim 2 of the present invention is provided as the exhaust purification system of an internal combustion engine as set forth in claim 1 characterized in that an amount of adsorbed $NO_X$ on the high temperature side adsorbed in the silver-alumina-based catalyst device when the temperature of the silver-alumina-based catalyst devices is equal to or higher than the second set temperature and is lower than the first set temperature is estimated.

An exhaust purification system of an internal combustion engine as set forth in claim 3 of the present invention is provided as the exhaust purification system of an internal combustion engine as set forth in claim 2 characterized in that only when the estimated amount of adsorbed $NO_X$ on the high temperature side is a first set amount or over, the $NO_X$ released from the silver-alumina-based catalyst device is reduced by the reducing material to be purified in the $NO_X$ reducing catalyst device when the temperature of the silver-alumina-based catalyst device becomes the first set temperature.

An exhaust purification system of an internal combustion engine as set forth in claim 4 of the present invention is provided as the exhaust purification system of an internal combustion engine as set forth in claim 2 or 3 characterized in that when the temperature of the silver-alumina-based catalyst device becomes the first set temperature and the $NO_X$ released from the silver-alumina-based catalyst device is reduced to be purified in the $NO_X$ reducing catalyst device, an amount of reducing material supplied to the $NO_X$ reducing catalyst device is determined on the basis of the estimated amount of adsorbed $NO_X$ on the high temperature side.

An exhaust purification system of an internal combustion engine as set forth in claim 5 of the present invention is provided as the exhaust purification system of an internal combustion engine as set forth in claim 1 characterized in that an amount of adsorbed $NO_X$ on the low temperature side adsorbed in the silver-alumina-based catalyst device when the temperature of the silver-alumina-based catalyst devices is lower than the second set temperature is estimated.

An exhaust purification system of an internal combustion engine as set forth in claim 6 of the present invention is provided as the exhaust purification system of an internal combustion engine as set forth in claim 5 characterized in that only when the estimated amount of adsorbed $NO_X$ on the low temperature side is a second set amount or over, the $NO_X$ released from the silver-alumina-based catalyst device is reduced by the reducing material to be purified in the $NO_X$ reducing catalyst device when the temperature of the silver-alumina-based catalyst device becomes the second set temperature.

An exhaust purification system of an internal combustion engine as set forth in claim 7 of the present invention is provided as the exhaust purification system of an internal combustion engine as set forth in claim 5 or 6 characterized in that when the temperature of the silver-alumina-based catalyst device becomes the second set temperature and the $NO_X$ released from the silver-alumina-based catalyst device is reduced to be purified in the $NO_X$ reducing catalyst device, an amount of reducing material supplied to the $NO_X$ reducing catalyst device is determined on the basis of the estimated amount of adsorbed $NO_X$ on the low temperature side.

According to the exhaust purification system of an internal combustion engine as set forth in claim 1 of the present invention, when the temperature of the silver-alumina-based catalyst device becomes a first set temperature on the high temperature side, $NO_X$ released from the silver-alumina-based catalyst device is reduced by reducing material to be purified in the $NO_X$ reducing catalyst device and when the temperature of the silver-alumina-based catalyst device becomes a second set temperature on the low temperature side, because $NO_X$ adsorbed when the silver-alumina-based catalyst device is lower than the second set temperature is released from the silver-alumina-based catalyst device, the $NO_X$ released from the silver-alumina-based catalyst device at this time is also reduced by reducing material to be purified in the $NO_X$ reducing catalyst device. Therefore, an amount of $NO_X$ emitted into the atmosphere can be sufficiently decreased.

According to the exhaust purification system of the internal combustion engine as set forth in claim 2 of the present invention, in the exhaust purification system of an internal combustion engine as set forth in claim 1, an amount of adsorbed $NO_X$ on the high temperature side adsorbed in the silver-alumina-based catalyst device when the temperature of the silver-alumina-based catalyst devices is equal to or higher than the second set temperature and is lower than the first set temperature is estimated.

According to the exhaust purification system of the internal combustion engine as set forth in claim 3 of the present invention, in the exhaust purification system of an internal combustion engine as set forth in claim 2, only when the estimated amount of adsorbed $NO_X$ on the high temperature side is a first set amount or over, the $NO_X$ released from the silver-alumina-based catalyst device is reduced by the reducing material to be purified in the $NO_X$ reducing catalyst device when the temperature of the silver-alumina-based catalyst device becomes the first set temperature. Therefore, when an amount of $NO_X$ released when the temperature of the silver-alumina-based catalyst device becomes the first set temperature is small, the reducing material is not supplied to the $NO_X$ reducing catalyst device in order to restrain the consumption of the reducing material.

According to the exhaust purification system of the internal combustion engine as set forth in claim 4 of the present invention, in the exhaust purification system of an internal combustion engine as set forth in claim 2 or 3, when the temperature of the silver-alumina-based catalyst device becomes the first set temperature and the $NO_X$ released from the silver-alumina-based catalyst device is reduced to be purified in the $NO_X$ reducing catalyst device, an amount of reducing material supplied to the $NO_X$ reducing catalyst device is determined on the basis of the estimated amount of adsorbed $NO_X$ on the high temperature side. Therefore, an amount of reducing material more than the needed amount is not supplied in order to restrain the consumption of the reducing material.

According to the exhaust purification system of the internal combustion engine as set forth in claim 5 of the present invention, in the exhaust purification system of an internal combustion engine as set forth in claim 1, an amount of adsorbed $NO_X$ on the low temperature side adsorbed in the silver-alumina-based catalyst device when the temperature of the silver-alumina-based catalyst devices is lower than the second set temperature is estimated.

According to the exhaust purification system of the internal combustion engine as set forth in claim 6 of the present invention, in the exhaust purification system of an internal combustion engine as set forth in claim 5, only when the estimated amount of adsorbed NO on the low temperature side is a second set amount or over, the NO released from the silver-alumina-based catalyst device is reduced by the reducing material to be purified in the $NO_X$ reducing catalyst device when the temperature of the silver-alumina-based catalyst device becomes the second set temperature. Therefore, when an amount of $NO_X$ released when the temperature of the silver-alumina-based catalyst device becomes the second set temperature is small, the reducing material is not supplied to the NO reducing catalyst device in order to restrain the consumption of the reducing material.

According to the exhaust purification system of the internal combustion engine as set forth in claim 7 of the present invention, in the exhaust purification system of an internal combustion engine as set forth in claim 5 or 6, when the temperature of the silver-alumina-based catalyst device becomes the second set temperature and the $NO_X$ released from the silver-alumina-based catalyst device is reduced to be purified in the $NO_X$ reducing catalyst device, an amount of reducing material supplied to the $NO_X$ reducing catalyst device is determined on the basis of the estimated amount of adsorbed NO on the low temperature side. Therefore, an amount of reducing material more than the needed amount is not supplied in order to restrain the consumption of the reducing material.

BEST MODE FOR CARRYING OUT THE INVENTION

Figure 1:
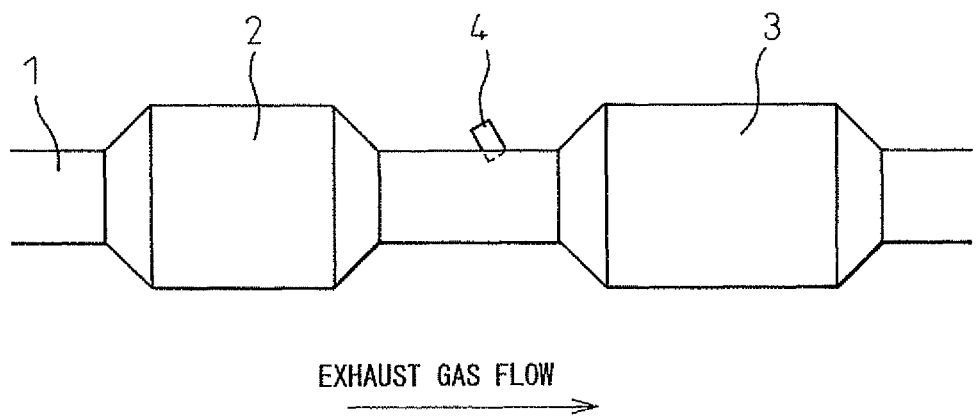
FIG. 1 is a schematic view showing the exhaust purification system of an internal combustion engine according to the present invention.

FIG. 1 is a schematic view showing the exhaust purification system of an internal combustion engine according to the present invention. In FIG. 1, reference numeral 1 is an exhaust passage of the engine. The engine is a diesel engine or a direct fuel injection-type spark-ignition engine which performs lean combustion. The exhaust gas of such an engine includes a relatively large amount of $NO_X$ so that a silver-alumina-based catalyst device 2 for adsorbing $NO_X$ is arranged in the exhaust passage 1. A $NO_X$ reduction catalyst device 3 for reducing $NO_X$ is arranged downstream of the silver-alumina-based catalyst device 2. A reducing material supply device 4 for supplying reducing material is arranged between the silver-alumina-based catalyst device 2 and the $NO_X$ reduction catalyst device 3.

The silver-alumina-based catalyst device 2 carries silver oxide by use of alumina as a carrier coat material, can adsorb $NO_X$ in the exhaust gas as silver nitrate, and releases the adsorbed $NO_X$ when it becomes a first set temperature (about 300 degrees C.). The released $NO_X$ can be reduced by the reducing material supplied from the reducing material supply device 4 to be purified in the $NO_X$ reduction catalyst device 3.

The silver-alumina-based catalyst device 2, for example, comprises a honeycomb-shaped base material on which an alumina $Al_2O_3$ carrier coat layer is formed, and carries silver oxide $Ag_2O$ on the alumina carrier coat layer in a ratio of silver 0.2 mol to alumina 200 g (for improving the heat resistance, lanthanum La may also be mixed in).

As the method of preparation of such a catalyst, for example, alumina MI386 ($La/Al_2O_3$) powder 1600 g, a binder A520 710.4 g, and water 3600 g are stirred by an atriter for 20 minutes, then the mixture is coated on the base material at 200 g/liter per unit volume. Next, this is fired in the atmosphere at 250 degrees C. for 30 minutes, then fired at 500 degrees C. for 1 hour to form an alumina carrier coat layer on the base material.

On the other hand, ion exchanged water is added to silver nitrate 236.2 g to make it dissolve to give a volume of 1700 cc to thereby prepare a silver nitrate aqueous solution with an Ag concentration of 0.82 mol/liter.

The above-mentioned alumina carrier coat layer is immersed in such a silver nitrate aqueous solution for 30 minutes to cause Ag to be carried at 0.2 mol/liter per unit volume by absorption. Next, a blower-type dryer is operated to dry the catalyst for 20 minutes, the catalyst is fired in the atmosphere at 550 degrees C. for 3 hours, then the catalyst is fired at 500 degrees C. for 3 hours while running nitrogen containing 5% of hydrogen at a rate of 7 liters a minute.

In a catalyst which is prepared in this way, the silver oxide $Ag_2O$ is exposed from the alumina $Al_2O_3$ carrier coat layer. After the NO in the exhaust gas is oxidized to $NO_2$, this can be held well as silver nitrate $AgNO_3$.

The $NO_X$ reduction catalyst device 3 can be made a three-way catalyst device. In this case, from the reducing material supply device 4, as the reducing material, for example, the fuel is supplied. The air-fuel ratio of the exhaust gas in the three-way catalyst device is made rich to purify the $NO_X$ by reduction.

Further, the $NO_X$ reduction catalyst device 3 can be made a selective reduction type $NO_X$ catalyst device which uses ammonia $NH_3$ to selectively purify $NO_X$ by reduction. In this case, the reducing material supply device 4 supplies urea as a reducing material, for example. At the selective reduction-type $NO_X$ catalyst device, the urea is hydrolyzed to generate ammonia to purify the $NO_X$ by reduction.

Further, if the $NO_X$ reduction catalyst device 3 is comprised of an upstream side oxidation catalyst device (carrying platinum Pt, silver Ag, or copper Cu, etc.) which can partially oxidize the hydrocarbons in the exhaust gas and a downstream side catalyst device (carrying platinum Pt or rhodium Rh) which purify nitrogen-containing hydrocarbon compounds (amine compounds, isocyanate compounds, and nitroso compounds) generated in the oxidation catalyst device from the partially oxidized hydrocarbons and $NO_X$ in the exhaust gas, hydrocarbons (fuel) are supplied as a reducing material from the reducing material supply device 4 for purifying the $NO_X$. In particular, if the supplied hydrocarbons are used to make the air-fuel ratio of the exhaust gas a 15.5 or less lean air-fuel ratio, the nitrogen-containing hydrocarbon compounds become easier to generate in the oxidation catalyst device and substantially all of the $NO_X$ in the exhaust gas can be purified.

However, even if the $NO_X$ released from the silver-alumina-based catalyst device 2 is reduced by the reducing material supplied from the reducing material supply device 4 in the $NO_X$ reduction catalyst device 3 only when the silver-alumina-based catalyst device 2 becomes the first set temperature, an amount of NO emitted into the atmosphere cannot be sufficiently decreased.

Figure 2:
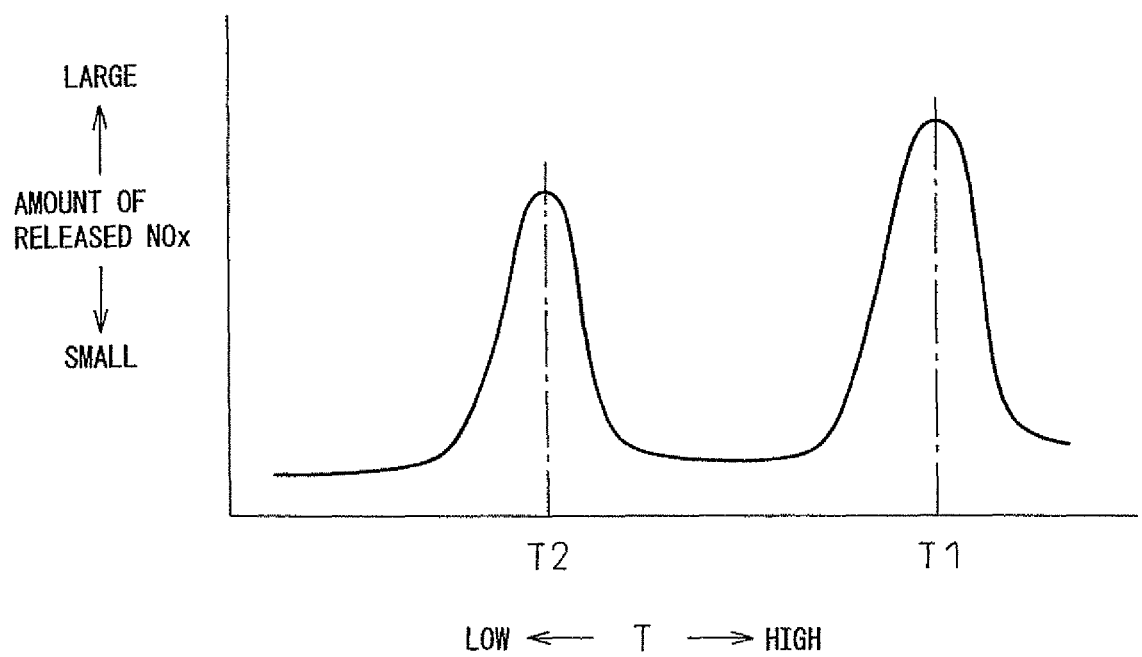
FIG. 2 is a graph showing a relationship between a temperature of the silver-alumina-based catalyst device and an amount of $NO_X$ released therefrom.

FIG. 2 shows a relationship between a temperature T of the silver-alumina-based catalyst device 2 and an amount of NO released therefrom. It is conceivable that the silver-alumina-based catalyst device 2 does not adsorb $NO_X$ only as silver nitrate but also adsorbs $NO_X$ as silver nitrite $AgNO_2$. It is conceivable that the $NO_X$ which is adsorbed as silver nitrate is released at the first set temperature T1 and the $NO_X$ which is adsorbed as silver nitrite is released at a second set temperature T2 (about 150 degrees C.) lower than the first set temperature T1. It is conceivable that the $NO_X$ in the exhaust gas is adsorbed mainly as silver nitrite when the silver-alumina-based catalyst device 2 is lower than the second set temperature T2, and the $NO_X$ in the exhaust gas is adsorbed mainly as silver nitrate when the silver-alumina-based catalyst device 2 is higher than the second set temperature T2 and is lower than the first set temperature T1.

Figure 3:
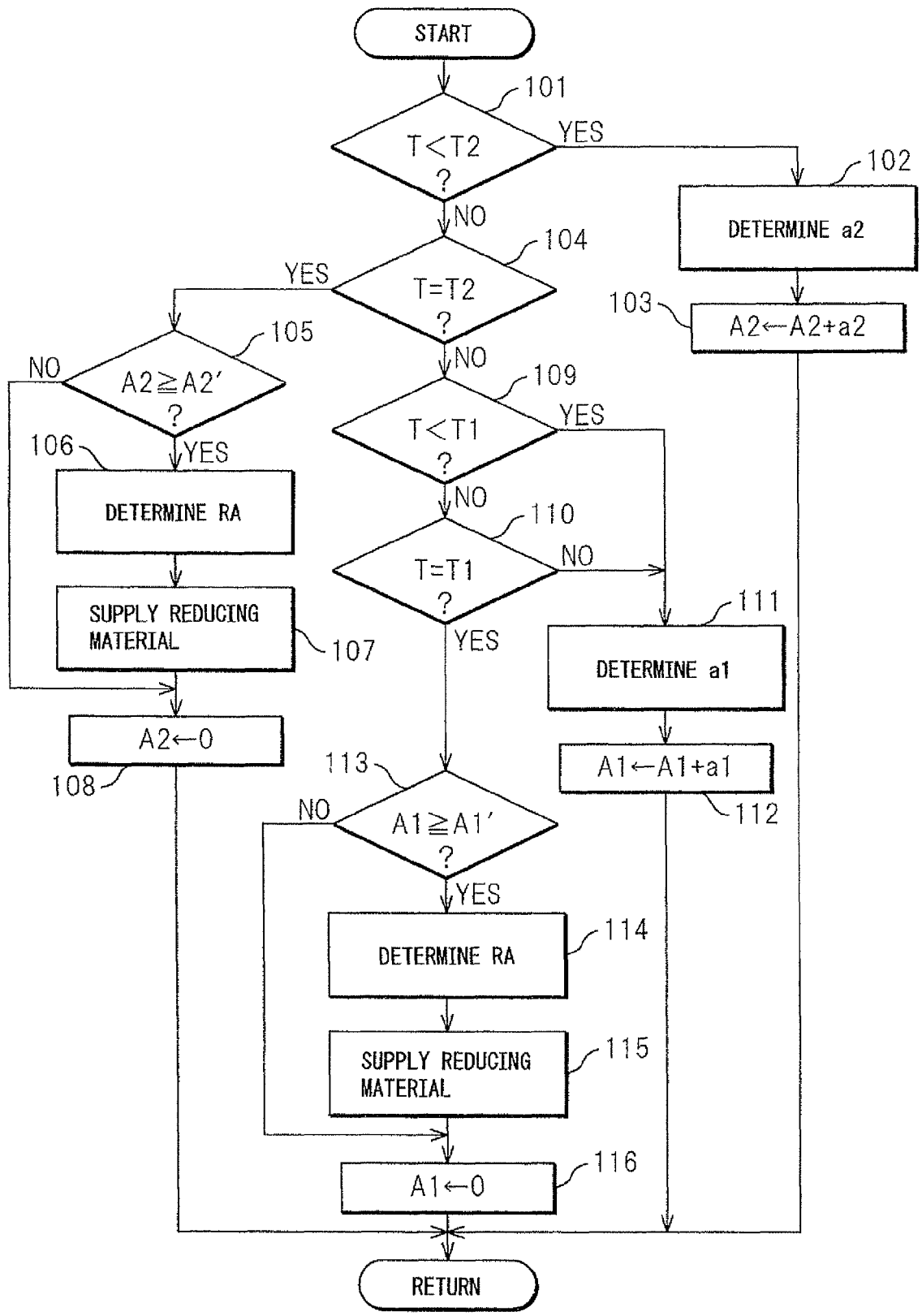
FIG. 3 is a flow-chart for reducing $NO_X$ carried out in the exhaust purification system according to the present invention.

The exhaust purification system of an internal combustion engine of the present embodiment controls the reducing material supply device 4 according to a flow-chart shown in FIG. 3 by an electronic control unit (not shown) to sufficiently decrease an amount of $NO_X$ emitted into the atmosphere.

First, at step 101, it is determined if the temperature T (measured or estimated) of the silver-alumina-based catalyst device 2 is lower than the second set temperature T2. When the result at step 101 is positive, the $NO_X$ in the exhaust gas is adsorbed in the silver-alumina-based catalyst device 2 as silver nitrite. Accordingly, at step 102, an adsorbing amount a2 newly adsorbed in the silver-alumina-based catalyst device 2 as silver nitrite per unit time is determined on the basis of a current engine operating condition (engine load and engine speed) and the current temperature T of the silver-alumina-based catalyst device 2 (the lower the temperature T is, the more the $NO_X$ is easily adsorbed) by using a map or the like. The adsorbing amount a2 per the unit time is based on an amount of $NO_X$ discharged from the cylinders per the unit time in each engine operating condition. The unit time is an interval for repeating the present flow-chart.

Next, at step 103, the adsorbing amount a2 determined at step 102 is integrated to an amount of adsorbed $NO_X$ A2 on the low temperature side adsorbed in the silver-alumina-based catalyst device 2 as silver nitrite. Thus, when the temperature of the silver-alumina-based catalyst device 2 is lower than the second set temperature T2, the $NO_X$ in the exhaust gas is adsorbed in the silver-alumina-based catalyst device 2 as silver nitrite so as to make the amount of adsorbed $NO_X$ A2 on the low temperature side gradually increase.

On the other hand, when the result at step 101 is negative, it is determined if the temperature T of the silver-alumina-based catalyst device 2 is the second set temperature T2 at step 104. When the result at step 104 is positive, almost all of $NO_X$ adsorbed as silver nitrite is released from the silver-alumina-based catalyst device 2. Next, at step 105, it is determined if the amount of adsorbed $NO_X$ A2 on the low temperature side adsorbed as silver nitrite in the silver-alumina-based catalyst device 2 is a set amount A2' or over. When the result at step 105 is negative, the amount of $NO_X$ adsorbed as silver nitrite is small and an amount of released $NO_X$ is also small so that the amount of adsorbed $NO_X$ A2 on the low temperature side adsorbed as silver nitrite in the silver-alumina-based catalyst device 2 is made 0 (or a small predetermined amount) at step 108 and the routine is finished as it is.

However, when the result at step 105 is positive, a relative large amount $NO_X$ adsorbed as silver nitrite is released from the silver-alumina-based catalyst device 2 so that an amount of reducing material RA supplied from the reducing material supply device 4 is determined on the basis of the amount of adsorbed $NO_X$ A2 on the low temperature side adsorbed as silver nitrite at step 106. Namely, the larger the amount of adsorbed $NO_X$ A2 on the low temperature side is, the larger the amount of reducing material RA is made. It is preferable to determine the amount of reducing material RA sufficient to reduce the $NO_X$ released from the silver-alumina-based catalyst device 2 in the downstream side $NO_X$ reduction catalyst device 3.

When the $NO_X$ reduction catalyst device 3 is a selective reduction type $NO_X$ catalyst device, the amount of reducing material RA is made an amount of urea of equivalence ratio for the amount of adsorbed $NO_X$ A2 on the low temperature side adsorbed as silver nitrite in the silver-alumina-based catalyst device 2. When the $NO_X$ reduction catalyst device 3 is a three-way catalyst device, the amount of reducing material RA is made the sum of an amount of fuel needed to make a current air-fuel ratio of the exhaust gas stoichiometric and an amount of fuel just enough to reduce the $NO_X$ adsorbed as silver nitrite in the silver-alumina-based catalyst device 2 and released therefrom.

Next, at step 107, the amount of reducing material RA determined at step 106 is supplied from the reducing material supply device 4, the amount of adsorbed $NO_X$ A2 on the low temperature side adsorbed as silver nitrite in the silver-alumina-based catalyst device 2 is made 0 (or a small predetermined amount) at step 108, and the routine is finished.

Thus, when the $NO_X$ released from the silver-alumina-based catalyst device 2 at the second set temperature T2 is purified by reduction in the $NO_X$ reduction catalyst device 3, an amount of reducing material more than the needed amount is not supplied so that the consumption of the reducing material can be restrained and the emission of reducing material into the atmosphere can be also restrained. The determination at step 105 may be omitted and thus when the silver-alumina-based catalyst device 2 becomes the second set temperature T2, the needed amount of reducing material RA may be always determined at step 106 to supply the reducing material at step 107.

Further, when the result at step 104 is negative, it is determined if the temperature T of the silver-alumina-based catalyst device 2 is lower than the first set temperature T1 at step 109. When the result at step 109 is positive, namely the temperature T of the silver-alumina-based catalyst device 2 is higher than the second set temperature T2 and is lower than the first set temperature T1, the $NO_X$ in the exhaust gas is adsorbed in the silver-alumina-based catalyst device 2 as silver nitrate. Accordingly, at step 111, an adsorbing amount al newly adsorbed in the silver-alumina-based catalyst device 2 as silver nitrate per unit time is determined on the basis of a current engine operating condition (engine load and engine speed) and the current temperature T of the silver-alumina-based catalyst device 2 (the lower the temperature T is, the more the $NO_X$ is easily adsorbed) by using a map or the like. The adsorbing amount al per the unit time is based on an amount of $NO_X$ discharged from the cylinders per the unit time in each engine operating condition. The unit time is an interval for repeating the present flow-chart.

Next, at step 112, the adsorbing amount al determined at step 111 is integrated to an amount of adsorbed $NO_X$ on the high temperature side adsorbed in the silver-alumina-based catalyst device 2 as silver nitrate. Thus, when the temperature of the silver-alumina-based catalyst device 2 is higher than the second set temperature T2 and is lower than the first set temperature T1, the $NO_X$ in the exhaust gas is adsorbed in the silver-alumina-based catalyst device 2 as silver nitrate to make the amount of adsorbed $NO_X$ A1 on the high temperature side gradually increase.

On the other hand, when the result at step 109 is negative, it is determined if the temperature T of the silver-alumina-based catalyst device 2 is the first set temperature Ti at step 110. When the result at step 110 is positive, almost all of $NO_X$ adsorbed as silver nitrate from the silver-alumina-based catalyst device 2 is released. Next, at step 113, it is determined if the amount of adsorbed $NO_X$ A1 on the high temperature side adsorbed as silver nitrate in the silver-alumina-based catalyst device 2 is a set amount A1' or over. When the result at step 113 is negative, the amount of $NO_X$ adsorbed as silver nitrite is small and an amount of released $NO_X$ is also small so that the amount of adsorbed $NO_X$ A1 on the high temperature side adsorbed as silver nitrate in the silver-alumina-based catalyst device 2 is made 0 (or a small predetermined amount) at step 116 and the routine is finished as it is.

However, when the result at step 113 is positive, a relatively large amount $NO_X$ adsorbed as silver nitrate is released from the silver-alumina-based catalyst device 2 so that an amount of reducing material RA supplied from the reducing material supply device 4 is determined on the basis of the amount of adsorbed $NO_X$ A1 on the high temperature side adsorbed as silver nitrate at step 114. Namely, the larger the amount of adsorbed $NO_X$ A1 on the high temperature side is, the larger the amount of reducing material RA is made. It is preferable to determine the amount of reducing material RA sufficient to reduce the $NO_X$ released from the silver-alumina-based catalyst device 2 in the downstream side $NO_X$ reduction catalyst device 3.

When the $NO_X$ reduction catalyst device 3 is a selective reduction type $NO_X$ catalyst device, the amount of reducing material RA is made an amount of urea of equivalence ratio for the amount of adsorbed $NO_X$ A1 on the high temperature side adsorbed as silver nitrate in the silver-alumina-based catalyst device 2. When the $NO_X$ reduction catalyst device 3 is a three-way catalyst device, the amount of reducing material RA is made the sum of an amount of fuel necessary to make a current air-fuel ratio of the exhaust gas stoichiometric and an amount of fuel just enough to reduce the $NO_X$ adsorbed as silver nitrate in the silver-alumina-based catalyst device 2 and released therefrom.

Next, at step 115, the amount of reducing material RA determined at step 114 is supplied from the reducing material supply device 4, the amount of adsorbed $NO_X$ A1 on the high temperature side adsorbed as silver nitrate in the silver-alumina-based catalyst device 2 is made 0 (or a small predetermined amount) at step 116, and the routine is finished.

Thus, when the $NO_X$ released from the silver-alumina-based catalyst device 2 at the first set temperature T1 is purified by reduction in the $NO_X$ reduction catalyst device 3, an amount of reducing material more than the needed amount is not supplied so that the consumption of the reducing material can be restrained and the emission of reducing material into the atmosphere can be also restrained. The determination at step 113 may be omitted and thus when the silver-alumina-based catalyst device 2 becomes the first set temperature T1, the needed amount of reducing material RA may be always determined at step 114 to supply the reducing material at step 115.

Further, when the result at step 110 is negative, namely the temperature T of the silver-alumina-based catalyst device 2 is higher than the first set temperature T1, the $NO_X$ in the exhaust gas is adsorbed in the silver-alumina-based catalyst device 2 as silver nitrate. Accordingly, in the same way as mentioned above, at step 111, the adsorbing amount al per unit time is determined and at step 112, the adsorbing amount al determined at step 111 is integrated to the amount of adsorbed $NO_X$ A1 on the high temperature side adsorbed in the silver-alumina-based catalyst device 2 as silver nitrate. However, when the temperature T of the silver-alumina-based catalyst device 2 is higher than the first set temperature T1, a rate of $NO_X$ in the exhaust gas adsorbed as silver nitrate decreases. Accordingly, the integration of the amount of adsorbed $NO_X$ A1 on the high temperature side may be stopped when the result at step 110 is negative.

Thus, according to the exhaust purification system of an internal combustion engine of the present embodiment, when the temperature of the silver-alumina-based catalyst device 2 becomes the first set temperature Ti on the high temperature side, the $NO_X$ released from the silver-alumina-based catalyst device is reduced by reducing material to be purified in the $NO_X$ reducing catalyst device 3 and when the temperature of the silver-alumina-based catalyst device becomes the second set temperature T2 in the low temperature side, because the $NO_X$ adsorbed when the silver-alumina-based catalyst device is lower than the second set temperature T2 is released, the $NO_X$ released from the silver-alumina-based catalyst device 2 at this time is also reduced by reducing material to be purified in the $NO_X$ reducing catalyst device 3. Therefore, an amount of $NO_X$ emitted into the atmosphere can be sufficiently decreased.

In the above mentioned flow-chart, to simplify the explanation, the temperature T at which the $NO_X$ is released from the silver-alumina-based catalyst device 2 is the first set temperature T1 (for example, about 300 degrees C.) and the second set temperature T2 (for example, about 150 degrees C.). However, these do not limit to the temperature points, and may be a first set temperature range (for example, from 290 degrees C. to 310 degrees C.) and a second temperature range (for example, from 140 degrees C. to 160 degrees C.).

The reducing material supply device 4 may be arranged upstream of the silver-alumina-based catalyst device 2. Further, the fuel injector which injects fuel into the cylinder can be used as the reducing material supply device when fuel is used as reducing material, and fuel may be injected into the cylinder by the fuel injector in, for example, an expansion stroke.

Further, in the embodiment shown in FIG. 1, the silver-alumina-based catalyst devices 2 and the $NO_X$ reducing catalyst device 3 are separated. However, this does not limit the present invention. For example, if a $NO_X$ reducing layer which carries $NO_X$ reducing catalyst is formed on a base material of cordierite or the like and a silver-alumina-based catalyst layer which is comprised of an alumina carrying silver oxide is formed on the $NO_X$ reducing layer, the silver-alumina-based catalyst devices 2 and the $NO_X$ reducing catalyst device 3 can be united.

In this case, when the silver-alumina-based catalyst layer becomes the first set temperature or the second set temperature and the $NO_X$ is released from the silver-alumina-based catalyst layer, the reducing material is supplied to the united device and the released $NO_X$ is reduced by the supplied reducing material to be purified in the $NO_X$ reducing layer under the silver-alumina-based catalyst layer.

LIST OF REFERENCE NUMERALS

1: exhaust passage
2: silver-alumina-based catalyst device
3: $NO_X$ catalyst device
4: reducing material supply device

The invention claimed is:

1. An exhaust purification system of an internal combustion engine in which the engine exhaust system, a silver-alumina-based catalyst device and $NO_X$ reducing catalyst device are arranged, wherein when a temperature of said silver-alumina-based catalyst device becomes a first set temperature on the high temperature side, $NO_X$ released from said silver-alumina-based catalyst device is reduced by reducing material to be purified in said $NO_X$ reducing catalyst device and when the temperature of said silver-alumina-based catalyst device becomes a second set temperature on the low temperature side, $NO_X$ released from said silver-alumina-based catalyst device is reduced by reducing material to be purified in said $NO_X$ reducing catalyst device.

2. An exhaust purification system of an internal combustion engine according to claim 1, wherein an amount of adsorbed $NO_X$ on the high temperature side adsorbed in said silver-alumina-based catalyst device when the temperature of said silver-alumina-based catalyst devices is equal to or higher than said second set temperature and is lower than said first set temperature is estimated.

3. An exhaust purification system of an internal combustion engine according to claim 2, wherein only when the estimated amount of adsorbed $NO_X$ on the high temperature side is a first set amount or over, the $NO_X$ released from said silver-alumina-based catalyst device is reduced by the reducing material to be purified in said $NO_X$ reducing catalyst device when the temperature of said silver-alumina-based catalyst device becomes said first set temperature.

4. An exhaust purification system of an internal combustion engine according to claim 3, wherein when the temperature of said silver-alumina-based catalyst device becomes said first set temperature and the $NO_X$ released from said silver-alumina-based catalyst device is reduced to be purified in said $NO_X$ reducing catalyst device, an amount of reducing material supplied to said $NO_X$ reducing catalyst device is determined on the basis of the estimated amount of adsorbed $NO_X$ on the high temperature side.

5. An exhaust purification system of an internal combustion engine according to claim 2, wherein when the temperature of said silver-alumina-based catalyst device becomes said first set temperature and the $NO_X$ released from said silver-alumina-based catalyst device is reduced to be purified in said $NO_X$ reducing catalyst device, an amount of reducing material supplied to said $NO_X$ reducing catalyst device is determined on the basis of the estimated amount of adsorbed $NO_X$ on the high temperature side.

6. An exhaust purification system of an internal combustion engine according to claim 1, wherein an amount of adsorbed $NO_X$ on the low temperature side adsorbed in said silver-alumina-based catalyst device when the temperature of said silver-alumina-based catalyst devices is lower than said second set temperature is estimated.

7. An exhaust purification system of an internal combustion engine according to claim 6, wherein only when the estimated amount of adsorbed $NO_X$ on the low temperature side is a second set amount or over, the $NO_X$ released from said silver-alumina-based catalyst device is reduced by the reducing material to be purified in said $NO_X$ reducing catalyst device when the temperature of said silver-alumina-based catalyst device becomes said second set temperature.

8. An exhaust purification system of an internal combustion engine according to claim 7, wherein when the temperature of said silver-alumina-based catalyst device becomes said second set temperature and the $NO_X$ released from said silver-alumina-based catalyst device is reduced to be purified in said $NO_X$ reducing catalyst device, an amount of reducing material supplied to said $NO_X$ reducing catalyst device is determined on the basis of the estimated amount of adsorbed $NO_X$ on the low temperature side.

9. An exhaust purification system of an internal combustion engine according to claim 6, wherein when the temperature of said silver-alumina-based catalyst device becomes said second set temperature and the $NO_X$ released from said silver-alumina-based catalyst device is reduced to be purified in said $NO_X$ reducing catalyst device, an amount of reducing material supplied to said $NO_X$ reducing catalyst device is determined on the basis of the estimated amount of adsorbed $NO_X$ on the low temperature side.

* * * * *